United States Patent [19]
Ramakrishnan et al.

[11] Patent Number: 5,636,355
[45] Date of Patent: Jun. 3, 1997

[54] DISK CACHE MANAGEMENT TECHNIQUES USING NON-VOLATILE STORAGE

[75] Inventors: Kadangode K. Ramakrishnan, Maynard, Mass.; Prabuddha Biswas, Nashua, N.H.

[73] Assignee: Digital Equipment Corporation, Maynard, Mass.

[21] Appl. No.: 85,715

[22] Filed: Jun. 30, 1993

[51] Int. Cl.$^6$ .................................................. G06F 12/08
[52] U.S. Cl. ............................................ 395/440; 395/470
[58] Field of Search .................... 364/200 MS File, 364/900 MS File; 395/400, 425, 440, 411, 445, 250, 872, 470

[56] References Cited

U.S. PATENT DOCUMENTS

| | | | |
|---|---|---|---|
| 4,603,380 | 7/1986 | Easton et al. | 395/425 |
| 4,636,946 | 1/1987 | Hartung et al. | 395/425 |
| 4,920,478 | 4/1990 | Furuya et al. | 395/425 |
| 4,956,803 | 9/1990 | Tayler et al. | 395/425 |
| 5,119,485 | 6/1992 | Ledbetter et al. | 395/425 |
| 5,309,451 | 5/1994 | Noya et al. | 395/425 |
| 5,353,410 | 10/1994 | Macon, Jr. et al. | 395/425 |

OTHER PUBLICATIONS

"The IBM 3990 Disk Cache", Jai Menon, IBM Almaden Research Center, San Jose, California; Mike Hartung, IBM Tucson Laboratory, Tucson, Arizona, pp. 146–151 1988.

*Primary Examiner*—Eddie P. Chan
*Assistant Examiner*—Hiep T. Nguyen
*Attorney, Agent, or Firm*—Arthur W. Fisher; Ronald C. Hudgens; Christine M. Kuta

[57] ABSTRACT

A method, and apparatus for its use, for reducing the number of disk accesses needed to satisfy requests for reading data from and writing data to a hard disk. A non-volatile cache memory used to hold data blocks for which write requests have been made is purged of "dirty" blocks, not yet written to the disk, based on the proportion of dirty blocks in relation to an upper threshold and a lower threshold. A purge request flag is set when the proportion of dirty blocks goes above the upper threshold, but is not cleared until the proportion of dirty blocks goes below the lower threshold. So long as the purge request flag is set, dirty blocks are purged when the disk is not busy with read requests. Immediate purging is initiated when the write cache becomes totally full of dirty blocks. Purging of dirty blocks is also effected during disk read accesses, by "piggybacking" a writing operation with the reading operation, to write dirty blocks destined for the same track or cylinder in which the requested read data blocks are located.

40 Claims, 3 Drawing Sheets

DISK CACHE MANAGEMENT TECHNIQUES USING NON-VOLATILE STORAGE

BACKGROUND OF THE INVENTION

This invention relates generally to disk caching techniques for computer systems and, more particularly, to techniques for managing cache memory for use in disk write operations. Rotating magnetic disks have become firmly established as reliable and relatively inexpensive devices for the storage of large amounts of data in computer systems. The principal drawback of disk storage devices is a relatively long delay between the time a disk operation is initiated and the time it is completed. This delay includes a seek latency during which the read/write heads are moved to a desired track or cylinder on a disk, and an additional rotational latency during which the disk rotates until a desired storage sector is under magnetic read/write heads. A disk drive usually has multiple recording surfaces, referred to as platters. A "cylinder" refers to a group of tracks, one on each platter, located at the same radial distance from the disk's axis of rotation. There is, of course an additional delay while data blocks are read from or written onto the disk surface.

The relative significance of disk latency has increased with recent dramatic improvements in computer processor speeds. Although there has also been some improvement in disk access times, the disk drive is still inherently limited in speed by its mechanical structure. A well known expedient that greatly reduces the number of disk accesses needed to run almost any software application, involves the use of a single common cache memory. The cache memory is usually a volatile random access memory (RAM) device, in which blocks of data read from a disk drive are stored for possible future use, and blocks of data to be written to the disk are temporarily stored to avoid an immediate disk operation. Whenever an application requests a disk read, the cache is first checked to see if the requested data block is already available. If so, a disk read operation is avoided. If not, the disk read operation is performed and the required block is transferred, given to the requesting application, and stored in the cache. When the cache is filled, new disk reads may result in having to remove blocks already in the cache. Removing blocks from the cache may be performed on any desired basis, such as keeping the most frequently used or most recently used blocks, or simply removing blocks on a first-in-first-out basis.

The same approach is not as easy to apply to disk write operations, because cached blocks not immediately written to the disk may be lost in the event of a power failure or some other condition that requires restarting the computer processor, or restarting a software system running on the computer. Therefore, the cache employs a "write through" procedure. When a disk write is requested, a memory block or blocks written into the cache are also immediately written onto the disk. When there is a read request, the cache is checked to determine if it contains an up to date version of each requested disk block. If the requested disk data is already cached, a disk read operation is avoided. However, the "write through" cache does not save any disk write operations.

A more recent innovation in this area is the use of a non-volatile random access memory (NVRAM) for disk caching. Because the contents of such a cache are not lost in the event of a power failure or similar catastrophic event, there is no need to perform disk writing immediately upon a request being made. Non-volatile disk caching prior to the present invention employed a simple "write behind" procedure, to write blocks of data to the disk only when the write cache is full. Thus, when the write cache becomes full, the write behind procedure decides which blocks to write to the disk. This decision is usually made on some reasonable basis, such as by choosing to write to the disk cylinder having the greatest number of "dirty" blocks in the write cache, or by choosing to write to the disk cylinder having the smallest seek distance (and access time). An example of a write caching scheme can be found in a paper by Jai Menon and Mike Hartung, entitled "The IBM 3990 Disk Cache," Proceedings of the IEEE Computer Society COMPCON Conference, 1988, pp. 146–51.

After dirty blocks are purged from the write cache by performing an actual disk write operation, they may be marked as "clean," which means that they are consistent with the data stored on the disk, and can be used to supply data for disk read operations.

In summary, there are three categories of prior disk caching systems: (a) single common cache with write through, (b) single common cache with write back, and (c) systems employing separate read and write caches. In the single common cache with write through, there are never any "dirty" blocks in the cache (because writes always go directly to the disk), but writes are costly in terms of overhead, since the cache is not effective for writes. The single common cache with write back reduces the number of writes to the disk, but there may be dirty blocks in the cache. A further difficulty is that the integrity of the disk data may be jeopardized in the event of a failure before the disk can be updated. Caching schemes using separate read and write caches are typified by the one described in the aforementioned paper by Menon et al. The system described in the paper apparently uses a volatile cache and a separate non-volatile (NV) write cache, but the write back policy is not specified.

A major disadvantage of the write behind procedure is that a disk write request initiated after the write cache is filled is stalled until the cache purge operation is completed and clean write cache blocks become available for use. Furthermore, if a write is initiated when the cache is filled and only a small amount of data is written in the interest of minimizing stall times, then many writes will frequently be needed, thus once again defeating the purpose of a write behind policy. Accordingly, it will be apparent that there is still a need for improvement in the field of disk caching techniques. In particular, what is needed is a write cache management technique that avoids the problems associated with the write behind procedure. The present invention satisfies this need and provides additional advantages.

SUMMARY OF THE INVENTION

The present invention resides in a method, and related apparatus, for managing a disk cache memory that can be used to advantage in reducing the number of disk write accesses needed to satisfy disk write requests. In method terms, the invention comprises the steps of processing each request to write a block of data to the disk by storing the block in the write cache memory; then repeatedly checking to determine the proportion of blocks in the write cache memory that have not been written to the disk; and deciding whether to write data to the disk (i.e., purge) based on the proportion of such blocks as compared with a preselected upper threshold and a preselected lower threshold. If the step of deciding whether to purge to the disk results in a decision to initiate purging, the method further includes selecting at least one block from the write cache memory, waiting till the disk is not busy with read operations, and writing the selected block or blocks to the disk. The use of multiple decision thresholds to determine when to start and stop purging the write cache memory significantly reduces the number of disk accesses needed to satisfy requests for writing data. Determining when to stop purging is important because purging too few or too many blocks at a time poses problems. For example, if only one block at a time is purged, the purging operation will oscillate about the first threshold. Therefore, there are a large number of writes resulting in a considerable amount of overhead since writes are not amortized. On the other hand, if too many blocks are purged at once large disk writes are used and read operations may stall behind these writes.

More specifically, the step of deciding whether to purge data includes setting a purge request flag when the proportion of blocks that have not been written to the disk exceeds the upper threshold; leaving the purge request flag set when the proportion of blocks that have not been written to the disk falls below the upper threshold; and clearing the purge request flag when the proportion of blocks that have not been written to the disk falls below the lower threshold. The steps of selecting at least one block, waiting till the disk is not busy, and writing to the disk, are initiated only when the purge request flag is set.

In addition, the method also includes the steps of checking at the end of insertion for a condition in which the write cache is totally full of blocks that have not been written to the disk and, if the condition is found, immediately selecting at least one block from the write cache memory, and writing the selected block or blocks to the disk.

Although the specific thresholds selected to initiate and terminate purging of the write cache will depend on the character and frequency of disk activity, for many applications satisfactory results can be obtained if the upper threshold is set at between approximately 90% and 95% of the capacity of the write memory cache, and the lower threshold is set at between approximately 30% and 50% of the capacity of the write memory cache.

If cost is no object and a single common non-volatile cache for reads and writes is used, then the upper and lower thresholds may be set dynamically based on disk access workloads. Preferably, the upper threshold is determined from the ratio of the number of blocks written over a long interval to the total of the number of blocks written and the number of blocks read over the same time interval; and the lower threshold is determined as a fixed fraction of the higher threshold.

In accordance with another aspect of the invention, the method includes intercepting each request to read data from the disk; then, at the time of each read request, checking the write cache memory for the presence of at least one "dirty" block of data that can be conveniently written to the disk at approximately the same time as data are read from the disk. The method then performs the step of combining data writing and data reading into a single operation, to effect purging of the write cache memory without an additional disk access. This technique is referred to as "piggybacking."

The step of checking the write cache memory for blocks that can be written during reading may include selecting all data blocks that need to be written to the disk which are to the same disk track location as the data to be read from the disk. This is referred to as "full piggybacking," and may add disk latency to the read operation if any of the blocks being written are located beyond the position of the data blocks being read. Another option is "free piggybacking," in which the step of checking the write cache memory further includes selecting from the data blocks to be written to the same disk track those that will be reached by the disk read/write heads prior to reaching the data to be read from the disk. Thus, in free piggybacking no additional disk rotation latency is incurred in performing the piggybacked disk write operations. The same two options of full and free piggybacking are also available for those disks that conveniently permit writing to an entire cylinder without significant delay to switch between one platter and another. Therefore, multiple platters are written in a single write operation if possible.

In terms of apparatus, the invention comprises a possibly volatile read cache memory for storing blocks of data read from the disk; a non-volatile write cache memory for storing blocks of data to be written to the disk; means for processing each request to write a block of data to the disk by storing the block in the write cache memory; means for repeatedly checking to determine the proportion of blocks in the write cache memory that have not been written to the disk, and are considered "dirty" blocks; means for deciding whether to purge data to the disk based on the proportion of such blocks as compared with a preselected upper threshold and a preselected lower threshold; and means operative if the step of deciding whether to purge to the disk results in a decision to initiate purging, for selecting at least one block from the write cache memory, then waiting till the disk is not busy with read operations, and writing the selected block or blocks to the disk. The apparatus also performs a purging operation immediately when the write cache is full.

The apparatus may also include means operative at the time of each read request, for checking the write cache memory for the presence of at least one block of data that can be conveniently written to the disk at approximately the same time as other data blocks are read from the disk, and means for combining data writing and data reading into a single operation, to effect purging of the write cache memory without an additional disk access. The apparatus of the invention may also be defined in terms approximately equivalent to the various method forms of the invention discussed above.

The principles of the invention are also applicable to a disk caching technique employing a single, preferably non-volatile, cache memory both for disk reads and for disk writes.

It will be appreciated from the foregoing that the present invention represents a significant advance in the field of disk caching techniques. In particular, the invention provides improved caching performance by using multiple decision thresholds to determine when purging the write cache is desirable, and by confining purging to times when the disk is not otherwise busy. Performance is further improved with the use of full or free piggybacking, to purge the write cache with little or no penalty in terms of disk latency. Other aspects and advantages of the invention will become apparent from the following more detailed description, taken in conjunction with the accompanying drawings.

DESCRIPTION OF THE PREFERRED EMBODIMENT

Figures 1, 2:
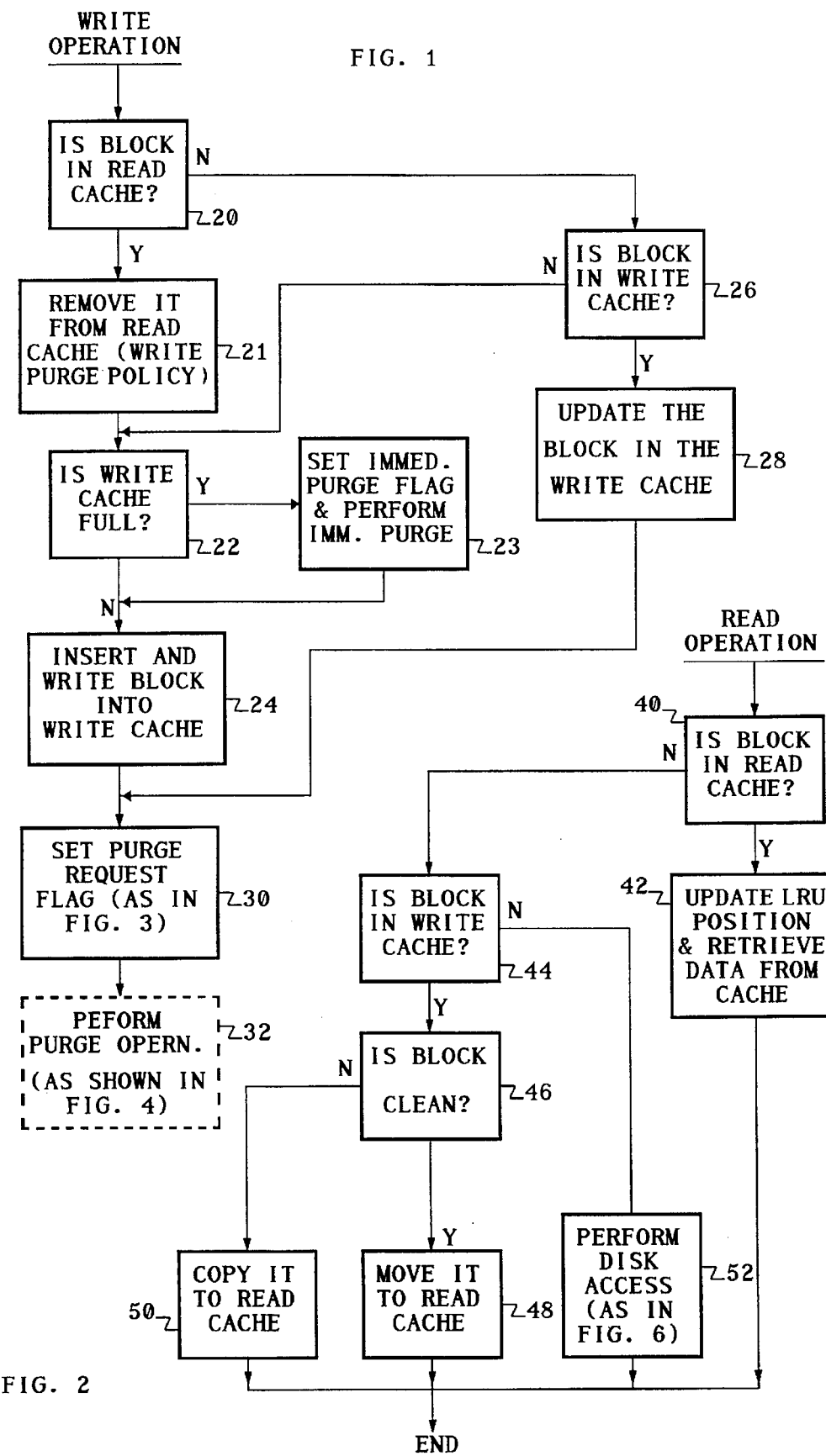
FIG. 1 is flowchart of a disk write operation in accordance with the invention.
FIG. 2 is a flowchart of a disk read operation.

As shown in the drawings for purposes of illustration, the present invention is concerned with disk caching techniques, and particularly with improvements in the manner in which a disk write cache memory is used to reduce disk access delays in a computer system. Non-volatile random access memories (NVRAMs) have been proposed for use as disk write cache memories. When a disk write operation is initiated on a block of data, the block is stored in the write cache (if space is available) instead of being immediately written to the disk. When the write cache becomes filled above a selected threshold, a number of selected blocks are written to the disk and more space is made available in the cache memory. In prior systems with a non-volatile write cache, the number of blocks written to the disk was either a small number of blocks, which caused oscillation about the purging threshold and consequently did not amortize the writes under heavy load, or a very large number of blocks, which resulted in a long write operation and a stall for other operations. A related difficulty with this approach is that all operations may become stalled once the write cache memory becomes filled.

Write behind with multiple thresholds:

In accordance with one aspect of the invention, a write cache has multiple preselected thresholds, and purging of the cache is usually performed only in quiescent periods. When a high-limit threshold is exceeded, the apparatus of the invention sets a "purge-request" flag, indicating that the write cache should be purged to the disk as soon as possible. As soon as the disk becomes idle, i.e. with no read operations pending for some preselected time interval, the write cache is purged by committing selected "dirty" blocks to the disk. A "dirty" block is one for which a disk write request has been initiated and data have been written to the cache memory, but no corresponding data have been committed to the disk. Because of the desirability of waiting for a quiet period to perform purging, the threshold must be less than 100% full. If the threshold is set too close to 100%, the cache may fill before a quiet period is detected, and a stall will result. Purging operations continue to be scheduled, at appropriate quiet periods, until the percentage of dirty blocks in the cache falls below second preselected threshold, referred to as the low threshold limit.

The selection of blocks to purge to the disk may be based on a combination of factors, such as the number of dirty blocks in a cylinder or platter, the distance of the dirty blocks from the current head position, or the age of the blocks since the last access. For example, the purging scheme might choose to write out dirty blocks belonging to the cylinder containing the most dirty blocks within a certain seek window from the current head position, i.e. in the neighborhood of the current head position.

Because actual purging operations are performed only when the disk is idle, there is a possibility during peak load periods that the write cache may not be purged and may become completely full of dirty blocks. In this situation, the apparatus of the invention schedules an immediate purge operation. This operation has the same priority as "read miss" requests to the disk (when a disk read operation cannot find a required data block in the read or write cache memory). Such requests are handled in first-in-first-out (FIFO) order by the disk. Immediate purging is discontinued as soon as there are any free buffers in the write cache. The apparatus then returns to quiescent purging, if purging is still required.

Piggybacking writes with reads:

In accordance with another aspect of the invention, the writing of dirty blocks from the write cache to the disk is performed, when possible, concurrently with disk read operations. When a read request is not satisfied by blocks in either the read cache or the write cache, there is a resulting "read miss" condition that requires a disk access. At this point, the method of the invention requires that the write cache be checked for dirty blocks belonging to the same disk track that will be accessed in the disk read access. In the case of a disk system when a full cylinder can be written, the cache is checked for all dirty blocks for that cylinder. If any such blocks are found, they are "piggybacked" with the read request and written to the disk in the same disk access operation. The blocks are then marked as "clean" in the write cache. The blocks read from the disk in the disk access operation are handled in accordance with a conventional read caching procedure, that is they are inserted into the read cache for possible use in this and subsequent disk read requests.

Figure 5:
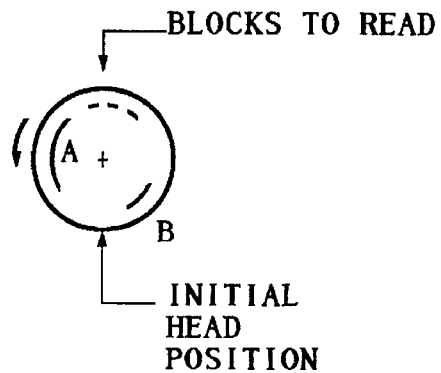
FIG. 5 is a diagrammatic view illustrating the principle of piggybacking of write and read operations.

There are two variations of the piggybacking operation: free piggybacking and full piggybacking. The difference between the two options is best explained with reference to FIG. 5, which diagrammatically depicts a disk platter. The arrow at the bottom of the figure represents the position of the read/write head through which data blocks are written to and read from the disk surface. The dashed arc at the upper right-hand side of the figure represents the angular position of a number of contiguous blocks of data for which a read operation has been requested. The disk platter is shown as rotating counter-clockwise past the head position. The solid arcs A and B represent the angular positions on the disk platter of blocks that are "dirty" and are to be located in the same disk track as the blocks of data to be read from the disk. Up to this point, only blocks in the write cache have been referred to as dirty, meaning that they have been written to the cache but not committed to the disk previously.

Block A is located between the read/write head and the blocks to be read from the disk. Block B is located beyond the blocks to be read from the disk. In free piggybacking, only block A is eligible for piggybacking, since it will pass beneath the read/write head while the system is waiting for the requested read blocks to reach the read/write head. In full piggybacking, all dirty blocks in the same track as the blocks being read are eligible for piggybacking. Thus, both blocks A and B are eligible. Under either scheme, purging of the write cache to the disk is accomplished without having to initiate a separate write operation to the disk. In the case of free piggybacking, the purge operation is "free," in the sense that no additional disk latency is involved beyond what would be incurred anyway as a result of a disk read access rotational latency. In the case of full piggybacking, the cost of purging all dirty blocks in a track is the latency involved in waiting for the disk to rotate beyond the blocks being read and back to the starting point at which the operation was initiated.

The way in which servo information is stored on the disk impacts the purging and piggybacking schemes. Some disks use a "dedicated servo" mechanism, in which one platter surface is dedicated to the storage of servo information relating to the position of the disk read/write head relative to the data sector in tracks on the disk. There are multiple read/write heads, one for each platter, and they are movable radially and in unison across the platter surfaces. The head associated with the dedicated servo platter reads information concerning the angular and radial positions of the heads with respect to the platters, and this information permits the accurate positioning of the heads with respect to any of the platters. Therefore, the dedicated servo mechanism permits the full piggybacking mechanism to be applied to a full disk cylinder, since if one track is aligned with the read/write heads then the other tracks in the same cylinder are also accurately aligned with the read write heads.

The other type of servo mechanism used in disks is referred to as the embedded servo technique, in which servo information is stored separately for each platter. Such disks can achieve a greater track density, and can therefore hold more data, but the heads on the different platters cannot be assumed to be exactly at the same track. Consequently, any purging or piggybacking mechanism may not be extended easily to a disk cylinder in disks employing the embedded servo technique.

Updating the read cache after purging the write cache:

In a system employing separate read and write caches, when a block is written to the disk a mechanism is needed to update the read cache, which may contain an out-of-date version of the block. Three alternative policies that may be used are: the "write allocate" policy, the "write update" policy and the "write purge" policy. Under the write allocate policy, a block written to the disk is also placed in the read cache, even if it was not previously in the read cache. If the block was previously in the read cache it is updated (the later version replaces the older version). Under the write update policy, the block is updated in the read cache only if was already present. Finally, under the write purge policy, a block that is written to the disk is removed from the read cache, if it is present. Thus, under the write purge policy the read cache will not be updated after a disk write operation until a subsequent read request is made. This is with the expectation that a read request of a block that is written is less likely.

Operation using read and write caches:

FIGS. 1–4 illustrate the functions performed during read and write operations, in a system having separate read and write caches and in which the write cache is operated in accordance with the present invention. It is assumed in these figures that the write purge policy is followed in updating the read cache; that is, a block written to the write cache is removed from the read cache, if present.

The write operation is shown in FIG. 1. First, a check is made to determine whether the block being written is already in the read cache, as shown at 20. If so, it is removed from the read cache in accordance with the write purge policy, as shown at 21. Before the block can be inserted and written into the write cache, a check must be made to determine whether the write cache is full, as indicated in block 22. If the cache is not full, the block is inserted and written into the write cache, as indicated at 24. If the cache is full, an immediate purge flag is set and a preselected number of "dirty" blocks are written to the disk to make room in the write cache, as indicated in block 23. Then the block involved in the write operation is inserted and written to the write cache, as indicated in block 24.

If the block to be written is not in the read cache, a check is made to determine if it is already in the write cache, as indicated at 26. If it is not in the write cache, the write cache is checked to make sure there is room (block 22), and the new block is inserted and written into the write cache as shown at 24. If the block to be written is already in the write cache, this indicates that an earlier version of the block was involved in a write request. Regardless of whether the block in the write cache is "clean" (written to the disk) or "dirty," it needs to be updated with the later version of the block now being written, as indicated at 28. The updated block will be labeled as "dirty."

After either inserting the block in the write cache (as shown at 24) or updating an existing block in the write cache (as shown at 28), the next step in the write operation is checking the status of the write cache to determine if purging dirty blocks to the disk is required. This is indicated at 30, and shown in more detail in FIG. 3. The write operation is virtually complete at this point, but the figure shows the additional step (in box 32, shown in broken lines) of performing a purge operation to write dirty blocks to the disk. Purging is shown as being implemented as a background task that continually checks a purge request flag and performs purging operations based on the state of the flag and the contents of the write cache. The purging operation is shown in more detail in FIG. 4.

The read operation is shown in FIG. 2 as including first checking, as indicated at 40, to determine whether the block being requested is already in the read cache. If the block is available from the read cache, the requested data can be retrieved from the read cache, as indicated at 42, and any necessary cache management functions are performed, such as LRU (least recently used) list manipulation. If the requested block is not in the read cache, the write cache is checked, as indicated at 44. If the block is in the write cache, the next operation depends on whether the block in the write cache is clean or dirty, as indicated at 46. If the block is clean, it has already been committed to disk and can therefore be removed from the write cache. In this implementation, such a block is moved to the read cache for responding now to the read request and for possible future use in read requests, as indicated at 48. If the read cache is full, standard replacement policy (LRU) is invoked. If the block is dirty, it has not been committed to the disk, so must remain in the write cache. However, it may be copied to the read cache, as indicated at 50. On a subsequent write operation, the block will be removed from the read cache. As an alternative, if the block is available in the write cache the response for the read may be directly made from the write cache. In such a case, there is no copy to the read cache. If the requested block is not in the read cache or the write cache, a disk access must be performed, as indicated at 52. Performing a read access from the disk may allow an opportunity to piggyback the writing of dirty blocks to the disk. This procedure is shown in more detail in FIG. 6.

Figures 3, 4:
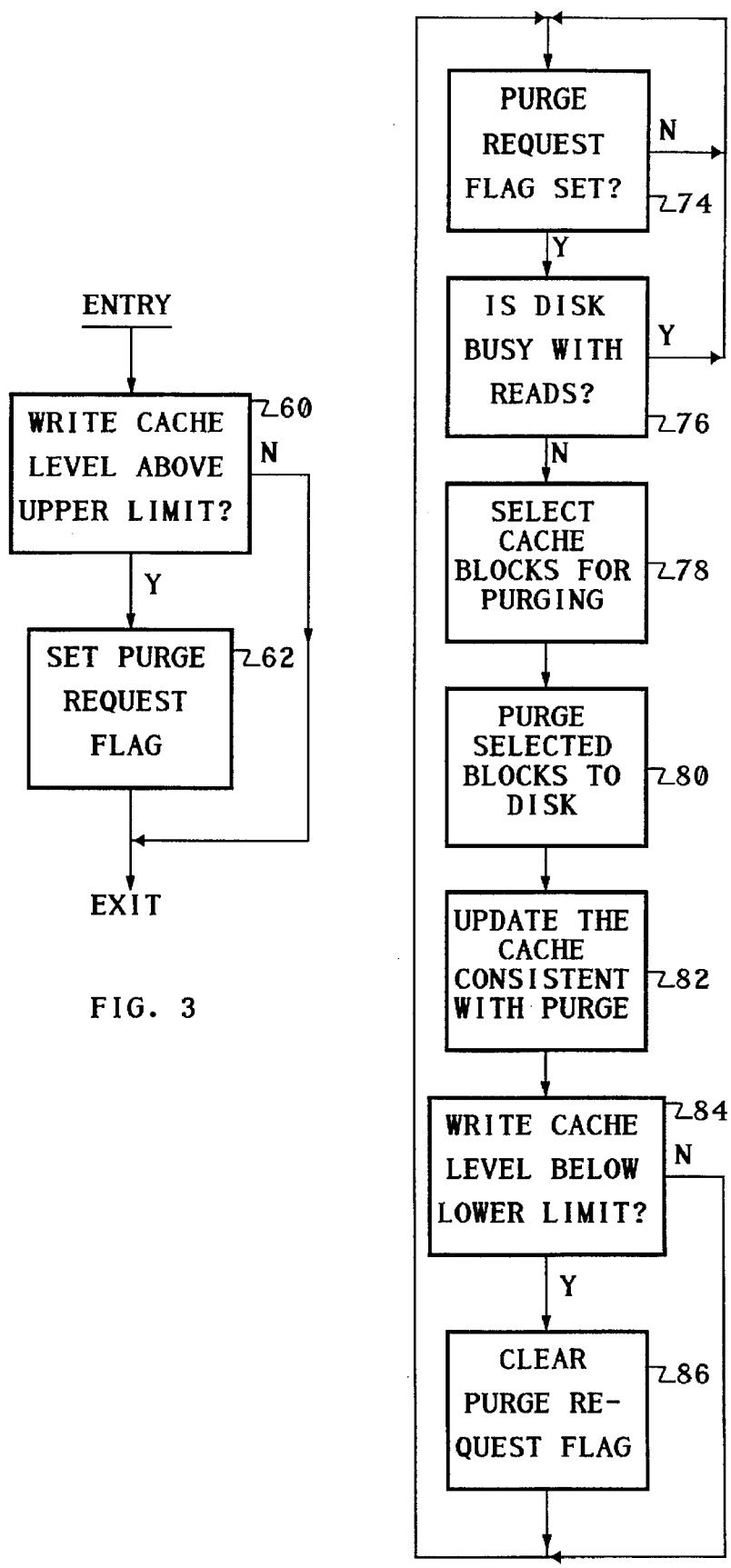
FIG. 3 is a flowchart of a procedure to set purge request flags in accordance with the invention.
FIG. 4 is a flowchart of a procedure to purge "dirty" blocks from the write cache memory in accordance with the invention.

FIGS. 3 and 4 show purge management procedures associated with writing a block of data to the disk using multiple write cache thresholds. If the write cache is filled above a preselected upper threshold limit, as indicated at 60, a purge request flag will be set, as indicated at 62, and purging will take place at the next quiescent period of disk operation. If the cache is full of dirty blocks, as determined at 22 (FIG. 1) during a write operation, there will be immediate purging of at least one block in the write cache. If the write cache is filled below a lower threshold limit, this will be detected in the background processing task to be discussed with reference to FIG. 4, and will result in clearing of the purge request flag.

As a result of repeated execution of the steps illustrated in FIGS. 3 and 4, the purge request flag will be set when the write cache is filled with dirty data blocks above the upper threshold limit, will remain set when the level drops back below the upper threshold limit, and will be cleared when the level drops below the lower threshold limit. When the purge request flag is set, purging will take place continually whenever the disk is not busy satisfying read accesses. When the purge request flag is not set, no purging will take place and the level of dirty blocks in the write cache will gradually increase.

The purging operation shown in FIG. 4 takes place as a continuing background task of the disk controller. Basically, purging involves continually checking the purge request flag, and performing writes to the disk as necessary. If the purge request flag is not set, as determined at 74, no purging action is taken. If the purge request flag is set, a check is made to determine whether the disk is busy with read operations, as indicated at 76. This test may be simply a matter of determining whether there are any disk read requests queued for execution, or may involve determining whether or not there have been any read accesses for some selected time interval. If there have not, the disk may be deemed "not busy" or "quiescent." The selected time interval may be, for example, in the range of two to three average disk access times, i.e. approximately 30–50 milliseconds.

Once it has been determined that purging is necessary and that the disk is not busy, the next step is to select a block or blocks for purging to the disk. The selection may be on a combination of three bases, such as (1) selecting a track that contains the most dirty blocks; (2) selecting blocks on the basis of minimizing disk seek time; and (3) selecting blocks based on LRU list of dirty blocks. The block selection step is indicated at 78. Then the selected blocks are written to the disk, as indicated at 80, and the final step, shown at 82, is to update the write cache consistent with having written a block or blocks to the disk. The number of blocks written in one request is the number of dirty blocks in that track or cylinder. A read request that arrives will stall at the most for a single cache write purge request of this size. Specifically, blocks purged to the disk are marked as clean in the write cache. If the write cache is filled below a lower threshold limit, as determined at 84, the purge request flag is cleared, as indicated at 86. Then the background task repeats its operation, beginning at block 74 again. Updating the read cache was taken care of at the beginning of the write operation (FIG. 1 at 21), i.e. by removal of a block from the read cache.

An immediate purge operation, indicated at 23, includes selecting a block or blocks from the write cache and purging the selected blocks to the disk, but without waiting for a quiescent disk. Consequently, an immediate purge may conflict with an ongoing disk read operation, but will still be completed in a relatively short time. After an immediate purge of at least one block from the write cache, the immediate purge flag is cleared (not specifically shown in the figures) and processing continues. With the immediate purge flag no longer being set, purging of additional blocks from the write cache continues only during quiescent periods of disk operation. The number of blocks selected to purge in an immediate purge operation is deliberately set to be relatively small, to keep the latency small and avoid read stalls. Only as many blocks as are needed to accommodate incoming blocks, are removed in an immediate purge. Typically, the number purged is equivalent to a full track on the disk.

Figure 6:
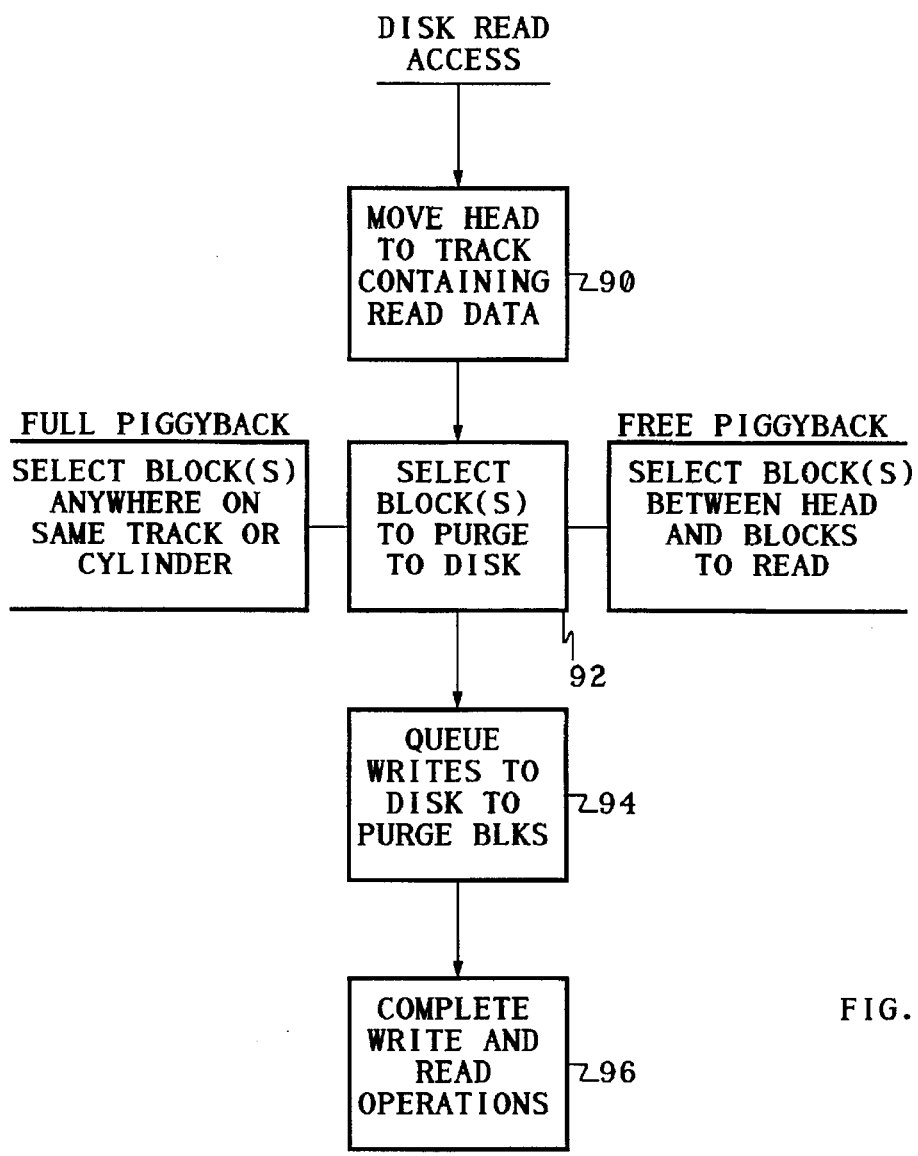
FIG. 6 is a flowchart of a piggybacking procedure in accordance with the invention.

The piggyback operation is shown in flowchart form in FIG. 6, and represents an expansion of the function shown at 52 in FIG. 2. During each read operation, disk writes can sometimes be piggybacked for little or no cost in terms of disk latency. The pertinent operations performed during a disk read are moving the read/write head to the appropriate track on which the requested data blocks are stored, as indicated at 90, and then waiting until the blocks are positioned under the read/write head. Once the head is in the desired track position, the piggyback function makes use of this condition by purging one or more blocks to the disk. Under the free piggyback scheme, only dirty blocks located between the initial head position and the position of the blocks to be read, may be written to the disk. An example is the block labeled A in FIG. 5. This block can be written to the disk without waiting for any additional head movement, and without cost in rotational disk latency. For the full piggyback scheme, any dirty block or blocks anywhere on the same track as the data blocks to be read, will be written to the disk. This includes block A and, for example, block B, which is located on the same track but beyond the position of the blocks that will be read from the disk.

Dirty blocks selected for piggybacking with reads, as indicated at 92, are limited to the same track or cylinder as the read data location. The selected disk write operations are initiated by the disk controller, to purge the selected blocks to the disk, as indicated at 94. Then the write and read operations are completed, as indicated at 96. Blocks written to the disk are marked as clean in the write cache memory, and blocks read from the disk are inserted into the read cache memory.

Single non-volatile disk cache:

The principles of the invention may be extended to cover a system employing a single large non-volatile cache for both reads and writes. Memory caches are usually maintained by chaining the entries together on the basis of which blocks are most recently used (MRU) or least recently used (LRU). In a conventional write behind technique using an LRU replacement policy, when a new block is added to the chain it replaces the least recently used block. A difficulty with this approach is that if the least recently used block is "dirty," it cannot simply be deleted from a write cache. It must be purged to the disk to avoid loss of data, but this disk access effectively stalls the cache insert operation. One option for avoiding this difficulty is to move the block to a non-volatile staging area and then perform the disk write asynchronously. Unfortunately, this requires specialized hardware support and is not an ideal solution. This disadvantage is avoided with the use of separate read and write caches. However, we also address the use of a single non-volatile cache and associated algorithm.

A preferred solution with a single non-volatile cache is to defer purging a dirty block when it comes to the end of the LRU chain. Instead the block is marked as a "target" for purging and the least recently used "clean" block is replaced to make room for a new block being inserted into the cache. Purging continues during quiescent periods, and the purging process selects blocks based, at least in part, on the presence of a "target" label of the individual block. For example, all dirty blocks in the same cylinder as a target block can be purged in one operation. If it happens that the cache is completely depleted of clean blocks, then an immediate purge will be initiated, as described in relation to the separate read and write cache embodiment. However, the need for immediate purging is reduced by the use of quiescent purging with multiple thresholds, and piggybacking required disk write operations with disk reads. Without using these techniques, the cache may become filled with "dirty" blocks resulting from write operations.

In the single-cache embodiment, the flowcharts of FIGS. 1 and 2 are much simplified. Basically, all of the function blocks pertaining to the read cache can be eliminated. In the write operation (FIG. 1) the cache is checked for presence of the block, as shown at 26, and the block being written is either inserted into the cache or used to update an existing block in the cache. In the read operation (FIG. 2), the cache is checked for the presence of the requested block, as shown at 44. If the block is present, the data can be immediately retrieved. If the block is not present in the cache, a disk access is performed, as indicated at 52. Data blocks read from the disk and placed in the cache will be initially labeled as "clean" and there is no need to keep them logically separate from clean blocks that have been written to the disk. In fact, the most compelling reason for maintaining separate caches is the high cost of non-volatile memory. Until the cost approaches that of volatile memory, it may be desirable to maintain separate read and write cache memories.

Dynamic Thresholds for the Single Cache Case:

Fixed values for the upper and lower thresholds in the case of a single common cache may not be appropriate for every environment. Ideally, the threshold values should be dynamically determined from the characteristics of the disk workload, and adjusted periodically. Experimental results indicate that a preferred heuristic way to determine an appropriate high limit threshold is from the ratio of the number of blocks written (over a long interval) to the total of the number of blocks written and the number of blocks read. The low limit threshold can be calculated as a fixed fraction, such as 0.4, of the high level threshold. The dynamic policy usually results in a performance almost as good as obtained by the best choice of fixed thresholds for a given workload. In many situations, however, it may not be practical to find the best fixed thresholds as the workload may keep changing, and a dynamic policy which will produce results almost as good is desirable.

Results:

The principles of the invention were analyzed using data obtained by tracing the disk activity of three interactive computer system environments: one involving office and scientific time sharing, a second involving time sharing and database activity, and a third involving transaction (airline reservation) processing. Disk operation data were collected over a period of at least a day for each operational system type. Then the effects of using various disk caching parameters were observed by simulation. Although the results are, in some respects, application specific, a number of generalizations can be made in comparing various write caching policies.

The following factors were used to quantify caching performance:

Write with Caching ($W_{WC}$)=writes to disk using caching as a percentage of total writes if no caching, IO stall=percentage of total IO operations that must be queued, Average Read Queuing time=total read ops. queuing time divided by number of read ops., Piggyback Success=percentage reads from disk with piggybacked writes.

Using a single threshold to initiate purging yields $W_{WC}$ values in the range of 40–50% of the total number of writes, using a threshold in the range of 90–95% of the write cache. If a second lower threshold is also used, the $W_{WC}$ values are reduced to approximately 15–20%, more than a 50% improvement over the single threshold case. Performance is relatively stable over a wide range of lower threshold settings, between 20% and 60% when the upper threshold was in the 90–95% range. The effect of keeping the lower threshold fixed at 40% and varying the upper threshold was also studied. It was clear that a high threshold of 100% increased the number of IO stalls, and a lower high threshold results in early triggering of purging, so that the cache is under utilized. At a 95% upper limit, the number of immediate purges triggered was negligible or zero.

The effect of cache size was analyzed with a upper threshold and a 40% lower threshold. For the three environments studied, the value of $W_{WC}$ decreases rapidly as the write cache size is increased to about one megabyte (MByte), but then the rate of improvement (indicated by decrease in $W_{WC}$) begins to slow. It appears that a 1–2 MByte non-volatile write cache per disk is adequate for the three systems studied.

The effect of free and full piggybacking was analyzed using upper and lower thresholds of 95% and 40%, respectively, and read and write cache sizes of 2 MBytes and 1 MByte, respectively. For track based piggybacking, the use of full piggybacking and free piggybacking resulted in a further reduction in $W_{WC}$ of 10–25% and 5–20%, respectively, over the two-threshold case with no piggybacking. For "full cylinder" piggybacking, $W_{WC}$ can be reduced by about 45–99% compared to the two-threshold scheme with no piggybacking. For the airline reservation system, piggybacking was so effective that explicit write operations were almost totally eliminated. Even cylinder based free piggybacking is quite effective, reducing $W_{WC}$ to only 0.6–5.6% of the total number of disk writes that would be needed without a write cache. The piggyback success factor (the percentage of disk reads on which writes are piggybacked) is 5–18% for track based full piggybacking, depending on the application, and 10–34% for cylinder based full piggybacking.

The analysis was further extended to determine the effect of a write allocate policy as compared with a write purge for updating the read cache. Under the write allocate policy, a copy of a block written is also kept in the read cache. Under the write purge policy, a block that is updated is removed from the read cache. If the probability of reading a disk block shortly after it has been updated is small, use of the write allocate policy will waste space in the read cache. For all three environments analyzed, the difference between the two policies was extremely small. Specifically, the values of $R_{WC}$, $W_{WC}$, IO stalls, and piggyback success varied by only up to a few percent when comparing the two policies. The conclusion reached was that the write purge policy was preferable for all environments except for storage devices with a large amount of read-after-write activity.

Finally, the trace data were used to compare the use of a single cache to the use of separate read and write caches. The performance of the separate caches was close to that of the single cache in two of the three systems studied. Therefore, it appears that having a small and separate non-volatile write cache provides substantial hardware cost savings without a large performance penalty.

It will be appreciated from the foregoing that the present invention represents a significant advance in the field of disk caching techniques. In particular, the invention provides for improved disk performance, in terms of fewer disk accesses, by using multiple thresholds to control a purging process, and by the use of piggybacking to write data blocks to the disk during an access that is required for disk reading. It will also be appreciated that, although specific embodiments of the invention have been described in detail for purposes of illustration, various modifications may be made without departing from the spirit and scope of the invention. Accordingly, the invention should not be limited except as by the appended claims.

We claim:

1. For use in a computer system having a hard disk and non-volatile write cache memory to reduce hard disk access operations, a method for using the non-volatile write cache memory more effectively, comprising the steps of:

processing each of a plurality of requests to write a block of data to the hard disk by storing the block in the non-volatile write cache memory;

repeatedly checking to determine a percentage of a plurality of blocks in the non-volatile write cache memory that have not been written to the hard disk, and deciding to purge data to the hard disk when the percentage of such blocks exceeds a preselected upper threshold limit;

setting a purge request flag when the percentage of blocks that have not been written to the hard disk first exceeds the upper threshold limit;

leaving the puree request flag set when the percentage of blocks that have not been written to the hard disk falls below the upper threshold limit; and clearing the purge request flag when the percentage of blocks that have not been written to the hard disk falls below a preselected lower threshold limit; and if the step of deciding whether to purge to the hard disk results in a decision to initiate purging, selecting at least one block from the non-volatile write cache memory, waiting until the hard disk is not busy with a plurality of read operations, and writing said selected block to the hard disk;

whereby the number of actual hard disk write accesses needed is reduced by the use of multiple decision threshold limits and Wherein the steps of selecting at least one block, waiting until the hard disk is not busy, and writing to the hard disk, are initiated only when the purge request flag is set.

2. The method as defined in claim 1, and further comprising:

repeatedly checking for a condition in which the non-volatile write cache memory is full of blocks that have not been written to the hard disk and, if the condition is found, immediately selecting at least one block from the non-volatile write cache memory, and writing each of the selected blocks to the hard disk, without waiting for the hard disk to become idle.

3. The method as defined in claim 1, wherein:

the upper threshold limit is set between 90% and 95% of the capacity of the non-volatile write cache memory; and the lower threshold limit is set between 30% and 60% of the capacity of the non-volatile write cache memory.

4. The method as defined in claim 1, and further comprising:

checking the non-volatile write cache memory at the time of each read request for the presence of at least one block of data that can be written to the hard disk at approximately the same time as data are read from the hard disk; and writing data and reading data in a single operation, to effect purging of the non-volatile write cache memory without an additional hard disk access.

5. The method as defined in claim 4, wherein the step of checking the non-volatile write cache memory includes:

selecting all data blocks that need to be written to the hard disk and to the same hard disk track location as data blocks requested to be read from the hard disk.

6. The method as defined in claim 5, wherein the step of checking the non-volatile write cache memory further includes:

selecting from the data blocks to be written to the same hard disk track those data blocks on the disk seek path to the data to be read from the hard disk, whereby the selected data blocks can be written to the hard disk with no additional hard disk rotation delay.

7. The method as defined in claim 4, wherein the step of checking the non-volatile write cache memory includes:

selecting all data blocks that need to be written to the hard disk and to the same hard disk cylinder location as data blocks requested to be read from the hard disk.

8. The method as defined in claim 7, wherein the step of checking the non-volatile write cache memory further includes:

selecting from the data blocks to be written to the same hard disk cylinder those data blocks on the disk seek path to the data to be read from the hard disk, whereby the selected data blocks can be written to the hard disk with no additional hard disk rotation delay.

9. For use in a computer system having a hard disk, a read cache memory and a non-volatile write cache memory to reduce hard disk access operations, a method for using the non-volatile write cache memory more effectively, comprising the steps of:

processing each of a plurality of requests to read a block of data from the hard disk by first checking to determine if the requested block is already in non-volatile write cache memory, and performing a read disk access only if the requested block is not available in non-volatile write cache memory;

processing each request to write a block of data to the hard disk by storing the block in the non-volatile write cache memory;

repeatedly checking to determine a percentage of blocks in the non-volatile write cache memory that have not been written to the hard disk, and deciding whether to purge data to the hard disk based on the percentage of such blocks as compared with a preselected upper threshold limit and a preselected lower threshold limit;

setting a purge request flag when the percentage of blocks that have not been written to the hard disk first exceeds the upper threshold limit;

leaving the purge request flag when the percentage of blocks that have not been written to the hard disk falls below the upper threshold limit;

clearing the purge request flag when the percentage of blocks that have not been written to the hard disk falls below the lower threshold limit; and if the step of deciding whether to purge to the hard disk results in a decision to initiate purging, selecting at least one block from the non-volatile write cache memory, waiting until the hard disk is not busy with read operations, and writing the selected one of the blocks to the hard disk;

whereby the hard disk write accesses needed are reduced in number by the use of multiple decision thresholds and wherein the steps of selecting at least one block, waiting until the hard disk is not busy, and writing to the hard disk are initiated only when the purge request flag is set.

10. The method as defined in claim 9, and further comprising:

repeatedly checking for a condition in which the non-volatile write cache memory is full of blocks that have not been written to the hard disk and, if the condition is found, immediately selecting at least one block from the non-volatile write cache memory, and writing the selected one of the plurality of blocks to the hard disk, without the hard disk becoming idle.

11. The method as defined in claim 9, wherein:

the upper threshold limit is set between 90% and 95% of the capacity of the non-volatile write cache memory; and the lower threshold limit is set between 30% and 60% of the capacity of the non-volatile write cache memory.

12. The method as defined in claim 9, and further comprising:

at the time of each read request that cannot be satisfied from the read cache memory, checking the non-volatile write cache memory for the presence of at least one block of data that can be written to the hard disk at approximately the same time as data are read from the hard disk; and combining data writing and data reading into a single operation, to effect purging of the non-volatile write cache memory without an additional hard disk access.

13. The method as defined in claim 12, wherein the step of checking the non-volatile write cache memory includes:

selecting all data blocks that need to be written to the hard disk and to the same hard disk track location as the data to be read form the hard disk.

14. The method as defined in claim 13, wherein the step of checking the non-volatile write cache memory further includes:

selecting from the data blocks to be written to the same hard disk track those data blocks on the disk seek path to the data to be read from the hard disk, whereby the selected data blocks can be written to the hard disk with no additional hard disk rotation delay.

15. The method as defined in claim 12, wherein the step of checking the non-volatile write cache memory includes:

selecting all data blocks that need be written to the hard disk and to the same hard disk cylinder location as the data to be read from the hard disk.

16. The method as defined in claim 15, wherein the step of checking the non-volatile write cache memory further includes:

selecting from the data blocks to be written to the same hard disk cylinder those data blocks on the disk seek path to the data to be read from the hard disk, whereby the selected data blocks can be written to the hard disk with no additional hard disk rotation delay.

17. The method as defined in claim 9, wherein the step of determining if a requested block to be read from the hard disk is already in read cache memory includes:

determining if the requested block is in the read cache memory and, if so, retrieving it from the read cache memory to satisfy the request;

if the requested block is not in the read cache memory, determining if it is in the non-volatile write cache memory;

if the requested block is in the non-volatile write cache memory and has been written to the hard disk, moving it to the read cache memory and satisfying the request; and if the requested block is in the non-volatile write cache memory and has not been written to the hard disk, copying it to the read cache memory and satisfying the request.

18. The method as defined in claim 9, wherein the step of determining if a requested block to be read from pard disk is already in read cache memory includes:

determining if the requested block is in the read cache memory and, if so, retrieving it from the read cache memory to satisfy the request;

if the requested block is not in the read cache memory, determining if it is in the non-volatile write cache memory; and if the requested block is in the non-volatile write cache memory, satisfying the request from the non-volatile write cache memory.

19. For use in a computer system having a hard disk and a single non-volatile cache memory to reduce disk access operations for both reads and writes, a method for using the non-volatile cache memory more effectively, comprising the steps of:

processing each one of a plurality of requests to read a block of data from the hard disk by first checking to determine if the requested block is already in the non-volatile cache memory, and performing a read disk access only if the requested block is not available in non-volatile cache memory;

processing each request to write a block of data to the hard disk by storing the block in the non-volatile cache memory;

repeatedly checking the non-volatile cache memory to determine a percentage of "dirty" blocks, which have been written to the non-volatile cache memory but have not been written to the hard disk, and deciding whether to purge data to the hard disk based on the percentage of such blocks as compared with a preselected upper threshold limit and a preselected lower threshold limit;

setting a purge request flag when the percentage of dirty blocks exceeds the upper threshold limit;

leaving the purge request flag set when the percentage of dirty blocks falls below the upper threshold limit;

clearing the purge request flag when the percentage of dirty blocks falls below the lower threshold limit; and if the step of deciding whether to purge to the hard disk results in a decision to initiate purging, selecting at least one dirty block from the non-volatile cache memory, waiting until the hard disk is not busy with read operations, and writing the selected dirty block to the hard disk;

whereby the number of actual hard disk write accesses needed is reduced by the use of multiple decision thresholds and when the steps of selecting at least one block, waiting until the hard disk is not busy, and writing to the hard disk, are initiated only when the purge request flag is set.

20. The method as defined in claim 19, and further comprising:

repeatedly checking for a condition in which the non-volatile cache memory is totally full of dirty blocks and, if the condition is found, immediately selecting at least one dirty block from the non-volatile cache memory, and writing each of the selected dirty blocks to the hard disk.

21. The method as defined in claim 19, wherein:

the upper threshold limit and the lower threshold limit are set dynamically based on hard disk access workloads.

22. The method as defined in claim 21, wherein:

the upper threshold limit is determined from the ratio of the number of blocks written over a long interval to the total of the number of blocks written and the number of blocks read over the same interval; and the lower threshold limit is determined as a fixed fraction of the higher threshold limit.

23. The method as defined in claim 19, and further comprising:

at the time of each read request to the non-volatile cache memory that cannot be satisfied, checking the non-volatile cache memory for the presence of at least one dirty block of data than can be written to the hard disk at approximately the same time as data are read from the hard disk; and combining data writing and data reading into a single operation, to effect purging of the non-volatile cache memory without an additional hard disk access.

24. The method as defined in claim 23, wherein the step of checking the non-volatile cache memory includes:

selecting all dirty blocks that need to be written to the hard disk and to the same hard disk track location as the data to be read from the hard disk.

25. The method as defined in claim 24, wherein the step of checking the non-volatile cache memory further includes:

selecting from the dirty blocks to be written to the same hard disk track those dirty blocks on the disk seek path to the data to be read from the hard disk, whereby the selected dirty blocks can be written to the hard disk with no additional hard disk rotation delay.

26. A method as defined in claim 23, wherein the step of checking the non-volatile cache memory includes:

selecting all dirty blocks that need to be written to the hard disk and to the same hard disk cylinder location as the data to be read from the hard disk.

27. The method as defined in claim 26, wherein the step of checking the non-volatile cache memory further includes:

selecting from the dirty blocks to be written to the same hard disk cylinder those dirty blocks on the disk seek path to the data to be read from the hard disk, whereby the selected dirty blocks can be written to the hard disk and with no additional hard disk rotation delay.

28. The method as defined in claim 19, and further comprising:

detecting when the non-volatile cache memory is full and a read request or a write request must store an additional block in the non-volatile cache memory;

selecting a candidate block for deletion from the non-volatile cache memory to make room for the additional block; and if the selected candidate block is dirty, marking the candidate block as a "target" for subsequent purging and selecting an alternative "clean" block, which has been written to the hard disk, for deletion from the non-volatile cache memory to make room for the additional block;

and wherein the step of selecting at least one dirty block for purging is based at least in part on which blocks have been designated as "targets."

29. The method as defined in claim 28, wherein:

the non-volatile cache memory consists of blocks chained together on the basis of which blocks are least recently used;

the step of selecting a candidate block for deletion includes selecting the least recently used block; and the step of selecting an alternative clean candidate block for deletion includes selecting the least recently used clean block.

30. Hard disk controller apparatus for reducing disk accesses needed to satisfy a plurality of read and write requests to a hard disk, the apparatus comprising:

a read cache memory for storing blocks of data read from the hard disk;

a non-volatile write cache memory for storing blocks of data to be written to the hard disk;

means for processing each request to write a block of data to the hard disk by storing the block in the non-volatile write cache memory;

means for repeatedly checking to determine the a percentage of blocks in the non-volatile write cache memory that have not been written to the hard disk;

means for deciding whether to purge data to the hard disk based on the percentage of such blocks as compared with a preselected upper threshold limit and a preselected lower threshold limit;

means for setting a purge request flag when the percentage of blocks that have not been written to the hard disk first exceeds the upper threshold limit, and leaving the purge request flag set when the percentage of blocks that have not been written to the hard disk falls below the upper threshold limit;

means for clearing the purge request flag when the percentage of blocks that have not been written to the hard disk falls below the lower threshold limit; and means operative if the step of deciding whether to purge to the hard disk results in a decision to initiate purging, for selecting at least one block from the non-volatile write cache memory, then waiting until the hard disk is not busy with read operations, and writing each of the selected blocks to the hard disk;

whereby the number of actual hard disk write accesses needed is reduced by the use of multiple decision thresholds and wherein the means for selecting at least one block, waiting until the hard disk is not busy, and writing to the hard disk, are operative only when the purge request flag is set.

31. Apparatus as defined in claim 30, and further comprising:

means for repeatedly checking for a condition in which the non-volatile write cache memory is totally full of blocks that have not been written to the hard disk and, if the condition is found, immediately selecting at least one block from the non-volatile write cache memory, and writing each of the selected blocks to the hard disk.

32. Apparatus as defined in claim 30, wherein:

the upper threshold limit is set at between 90% and 95% of the capacity of the non-volatile write cache memory; and the lower threshold limit is set at between 30% and 60% of the capacity of the non-volatile write cache memory.

33. Apparatus as defined in claim 30, and further comprising:

means operative at the time of each read request, for checking the non-volatile write cache memory for the presence of at least one block of data that can be written to the hard disk at approximately the same time as data are read from the hard disk; and means for combining data writing and data reading into a single operation, to effect purging of the non-volatile write cache memory without additional hard disk access.

34. Apparatus as defined in claim 33, wherein the means for checking the non-volatile write cache memory includes:

means for selecting all data blocks that need to be written to the hard disk and to the same hard disk track location as the data to be read from the hard disk.

35. Apparatus as defined in claim 34, wherein the means for checking the non-volatile write cache memory further includes:

means for selecting from the data blocks to be written to the same hard disk track those data blocks on the disk seek path to the data to be read from the hard disk, whereby the selected data blocks can be written to the hard disk with no additional hard disk rotation delay.

36. Apparatus as defined in claim 33, wherein the means for checking the non-volatile write cache memory includes:

means for selecting all data blocks that need to be written to the hard disk and to the same hard disk cylinder location as the data to be read from the hard disk.

37. Apparatus as defined in claim 36, wherein the means for checking the non-volatile write cache memory further includes:

means for selecting from the data blocks to be written to the same hard disk cylinder those data blocks on the disk seek path to the data to be read from the hard disk, whereby the selected data blocks can be written to the hard disk with no additional hard disk rotation delay.

38. Hard disk controller apparatus for reducing disk accesses needed to satisfy a plurality of read and write requests to a hard disk, the apparatus comprising:

a single non-volatile cache memory for storing blocks of data read from, and to be written to, the hard disk;

means for processing each request to read a block of data from the hard disk by first checking to determine if the requested block is already in the single non-volatile cache memory, and performing a read disk access only if the requested block is not available in single non-volatile cache memory;

means for processing each request to write a block of data to the hard disk by storing the block in the single non-volatile cache memory;

means for repeatedly checking to determine the proportion of blocks in the single non-volatile cache memory that have not been written to the hard disk;

means for deciding whether to purge data to the hard disk based on the percentage of such blocks as compared with a preselected upper threshold limit and a preselected lower threshold limit;

means for setting purge request flag when the percentage of blocks that have not been written to the hard disk first exceeds the upper threshold limit, and leaving the purge request flag set when the percentage of blocks that have not been written to the hard disk falls below the upper threshold limit;

means for clearing the purge request flag when the percentage of blocks that have not been written to the hard disk falls below the lower threshold limit; and means operative if the step of deciding whether to purge to the hard disk results in a decision to initiate purging, for selecting at least one block from the single non-volatile write cache memory, then waiting until the hard disk is not busy with read operations, and writing the selected blocks to the hard disk;

whereby the number of actual disk write accesses needed is reduced by the use of multiple decision thresholds and wherein the means for selecting at least one block, waiting until the hard disk is not busy, and writing to the hard disk, are operative only when the purge request flag is set.

39. Apparatus as defined in claim 38, and further comprising:

means for setting the upper threshold limit and the lower threshold limit dynamically based in hard disk access workloads.

40. Apparatus as defined in claim 39 wherein:

the upper threshold limit is determined from the ratio of the number of blocks written over a long interval to the total of the number of blocks written and the number of blocks read over the same time interval; and the lower threshold limit is determined as a fixed fraction of the higher threshold limit.

* * * * *